March 10, 1959 E. E. MUNGER, JR 2,877,303

TELEPHONE ANSWERING DEVICE

Filed April 15, 1955 2 Sheets-Sheet 1

INVENTOR.
ELBERT ERVIN MUNGER, JR.
BY Marvin Moody
ATTORNEY

March 10, 1959 E. E. MUNGER, JR 2,877,303

TELEPHONE ANSWERING DEVICE

Filed April 15, 1955 2 Sheets-Sheet 2

INVENTOR.

ELBERT ERVIN MUNGER, JR.

BY Marvin Moody

ATTORNEY 2,877,303

TELEPHONE ANSWERING DEVICE

Elbert Ervin Munger, Jr., Spencer, Iowa

Application April 15, 1955, Serial No. 501,533
5 Claims. (Cl. 179—6)

This invention relates in general to devices for answering the telephone automatically and in particular to a device which automatically answers and records messages without being connected electrically to the telephone.

The invention of the telephone has proved to be a great boon to mankind in the savings of time, and the very rapid communication possible with it. However, it is generally necessary that there be a person at both ends of the line to convey a message and at certain times it would be very convenient if the caller could receive and leave a message even though there were no one at one end of the line. For example, suppose that a doctor is outside of his office. It would be very helpful if he had a record of all the calls received when he returns to the office. Also in business offices or in the home it would be time saving and convenient to have a record of all incoming calls. There are certain apparatuses available which are capable of answering the telephone and recording incoming messages. However, these apparatuses require an interconnection with the electrical circuits of the telephone and or attaching mechanical linkages to the phone.

It is an object of this invention therefore, to provide a phone answering device which does not connect to the electrical or mechanical system of the telephone.

Another object of this invention is to provide an excellent answering device which is cheap to construct and to maintain.

A feature of this invention is found in the provision for a telephone answering device which responds to incoming phone calls photoelectrically and gives a message and records an incoming call.

Further objects, features, and advantages of this invention will become obvious from the following description and claims when read in view of the drawings in which:

Figure 1 indicates the complete arrangement of the equipment;

Before going to the detail description of this invention, a short discussion will be given which makes clear the operation of the device.

An incoming call energizes the telephone bell in a conventional manner. A recording device, as for example, a tape recorder, has a microphone placed near the bell and insulated from extraneous sounds.

The recorder is always energized when it is desired to have automatic operation. That is to say it is plugged into a suitable power supply and the "on" switch is thrown so that a record may be made quickly. The "record" switch is not closed, but is operated by the telephone bell in the following manner. Since the "on" switch of the recorder is on, the volume-level indication light is on. This is the little light on the top of the tape recorder which flickers as the amplitude of the received sound is varied. When the telephone rings the volume-level indication light becomes bright and causes a photo-electric device to actuate a trigger release that starts a record player, the recorder, and lifts a weight on the telephone so that it is turned on.

An amplifier is connected to the output of the record player and supplies sound to the mouth piece of the telephone. A message is given to the caller in this fashion and he is then told to leave a recorded message. This is furnished by a second microphone to the recorder. The player arm of the record player furnishes the timing function. It turns on and cocks the mechanisms so that it is able to receive the next message. When the owner returns he can replay the tape recorder and obtain all the messages.

Figure 1:
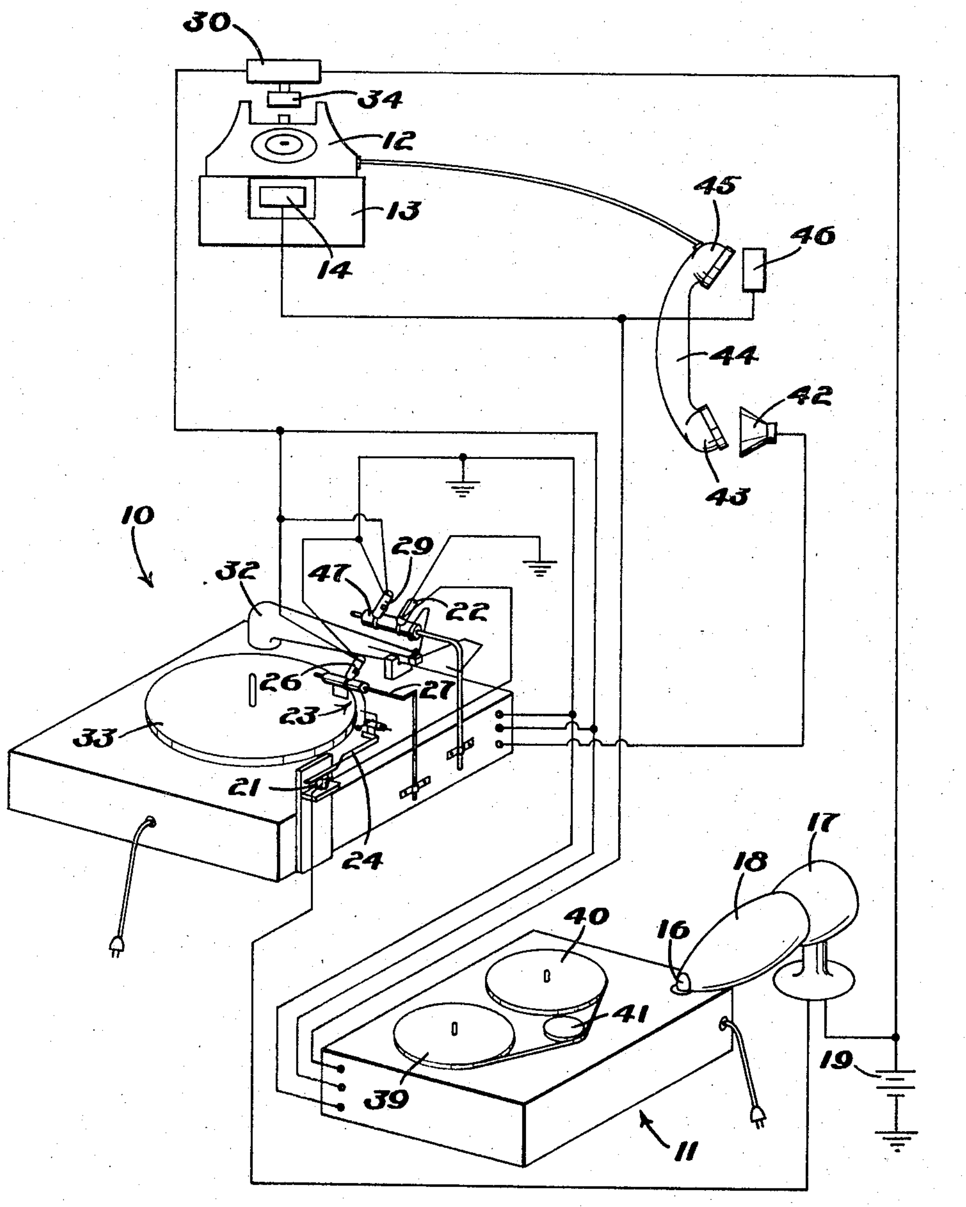
Figure 2:
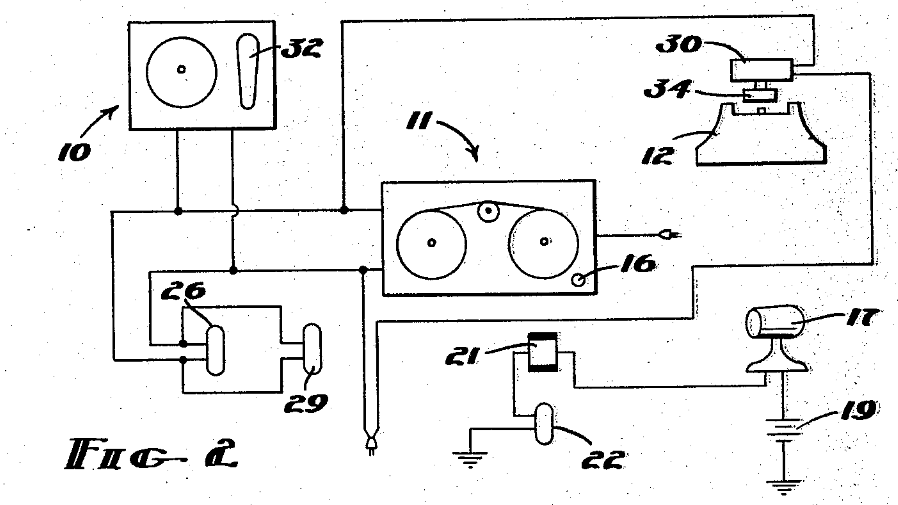
Figure 2 illustrates the wiring layout of certain portions of the invention.

Figure 1 illustrates a record player 10, a tape recorder 11, and a telephone base 12. The telephone base 12 sits on a holder 13 that is formed with an opening in which is placed a first microphone 14. The microphone 14 may be insulated from sounds other than the bell by surrounding it with excelsior or other sound absorbent material so that sounds such as doors being slammed do not actuate the apparatus.

The microphone 14 is connected to the recorder 11. The recorder is plugged into a suitable power supply and is turned on so that its tubes are lighted. Also the volume-indication level light 16 is on. However, the "record" motor is not turned on. When the phone rings, the microphone 14 furnishes sound to the tape recorder and causes the light 16 to become brighter. A photo-electric cell 17 is mounted near the light 16 and a mask 18 extends between them.

The photo-electric cell 17 has one side connected to a suitable voltage source 19, that may be a battery, and one side is connected to a first relay 21 on the record player. The other side of the relay 21 is connected to a mercury switch 22 mounted on a bracket 31 which is shown in detail in Figure 5. The other side of switch 22 is connected to ground. It is in the closed position when the apparatus is unenergized and thus when the bell rings, the circuit through relay 21 and through mercury switch 22 is closed and the trigger release lever 24 is moved downward to allow the trigger assembly to rotate by gravity so that a mercury switch 26 mounted on the trigger shaft 27 is closed.

Switch 26 controls the record player, the tape recorder, and the weight lifting relay 30 which energizes the telephone. Another mercury switch 29 is mounted on bracket 31 adjacent to switch 22 and on the same rotatable sleeve 47 near the rest position of the player arm 32 as shown in detail in Figure 5. It is normally open and closes when the arm 32 leaves its rest position while switch 22 does just the reverse. Switches 26 and 29 are connected in parallel. When either of these switches is closed the record player is energized, the tape recorder is recording, and the weight lifting relay 30 is energized. The function of switch 22 is primarily to prevent sound of the telephone answering equipment, during its operation, from energizing relay 21 and causing tripping of the trigger prematurely and useless operation of the relay when trigger is out of reach of the arm 24—57.

A record is held on the turn table 33 of the record player and when the switches 26 and 29 are energized, the turn table turns. When the trigger mechanism operates and switch 26 is closed, the player arm 32 moves upwardly and to the record and starts to play. When it leaves the rest position it closes switch 29. The switches 26 and 29 are connected in circuit with the telephone weight lifting relay 30 and cause it to be energized so that it lifts a weight 34 from the telephone and thus turns it on. The tape recorder is also triggered by switches 26 and 29 and it starts the tape moving past the recording head.

As shown in Figure 1 the tape recorder has a pair of reels 39 and 40 and the recording tape extends between them and passes over the recording head 41.

The player arm 32 comes to rest on the record mounted on the turntable 33 and an output is furnished from the record player to a speaker 42 which is mounted near the mouth piece 43 of a hand set 44 of the telephone. The record gives a message to the caller, as for example, it might say "The doctor is out of the office and you may leave a message that will be recorded. You will have two minutes from now to complete your message."

The record player arm 32 will continue to travel on a grooved part of the record which has no sound until it goes to the center at which time the record player arm will move back to its rest position resetting the trigger in the process.

During this time the caller may give a message which will pass from the ear piece 45 to a second microphone 46 that is connected to the tape recorder. The tape recorder will record the message on the tape.

The arm 32 serves as the timing apparatus and turns the record player and tape recorder off when it returns to its rest position as well as allowing the weight to lower onto the telephone which restores the phone to its state of readiness for a call coming in.

Figure 5:
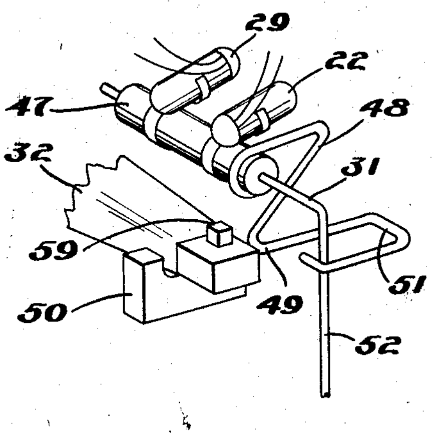
Figure 5 is a detail view of the switch actuator.

Figure 5 illustrates the rest position of the arm 32 and the actuating mechanism for switches 22 and 29. It is to be noted that the bracket 31 supports a sleeve 47 which supports the mercury switches 29 and 22. An actuator 48 has an arm-engaging portion 49 and a motion limiting loop 51 that passes around the lower portion 52 of the bracket 31.

A rest 50 supports the player arm 32 when it is at rest. In the condition shown in Figure 5 the switch 29 is open and switch 22 is closed. However, when the arm 32 moves away from the rest 50 the switch 29 is energized and switch 22 is opened.

Figure 4:
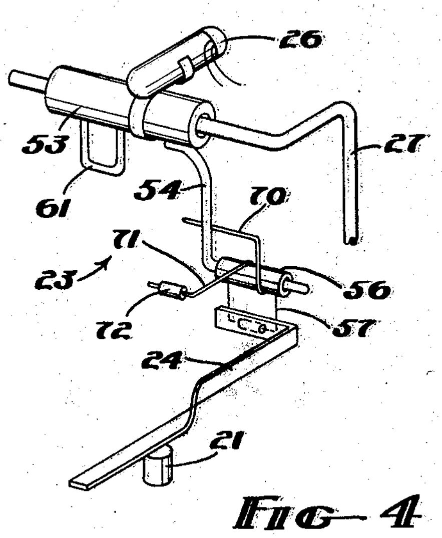
Figure 4 is a detail view of the trigger mechanism.

Figure 4 illustrates the trigger mechanism. Trigger shaft 27 supports a sleeve 53 which in turn supports a switch 26 which is normally opened. An arm 54 extends downwardly from the sleeve 53 and supports a collar 56.

A trigger engaging member 57 extends downwardly from the collar 56 and is engaged by the trigger lever 24. A limiting arm 70 is attached to the collar 56 and limits counter-clockwise motion relative to Figure 4.

A weight supporting arm 71 is attached to collar 56 and supports a weight 72 which bias the collar in the counter clockwise direction.

When the phone rings, the relay 21 is energized, thus causing trigger arm 24 to move downwardly.

Due to the weight of switch 26 the sleeve 53 rotates on shaft 27 thus closing switch 26 and moving the collar 50 upwardly.

The apparatus remains in this position until the record player arm moves back toward its rest 50 after the record has been played and time has been given for the recorder to record the incoming message. The arm 32 passes over the trigger mechanism as it travels to the record. A pin 59 is attached to the top of the record player arm and engages a reset loop 61 on the collar 53 to rotate it counterclockwise with respect to Figure 4 until the trigger engaging member 57 engages the arm 24 to hold it in this position, thus opening switch 26. The pin 59 slips past the loop 61 and returns to its rest position at which time it opens switch 29 and closes switch 22 and the record player and tape recorder are turned off and the apparatus is ready for the next incoming call.

Figure 3:
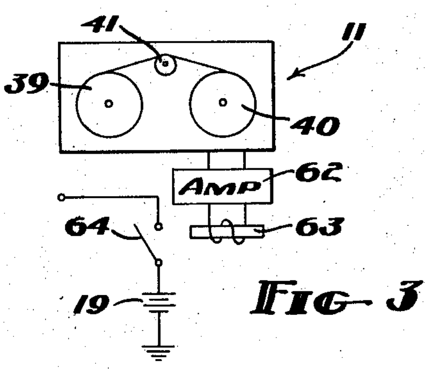
Figure 3 illustrates a modification of the invention.

A modification of the invention is shown in Figure 3 wherein the photoelectric cell 17 and volume indication level light 16 are replaced by an amplifier 62 which receives the current that would normally pass through the light. A relay 63 is connected to the output of the amplifier and is energized when the telephone bell rings. This closes a switch 64 which is connected in series with the battery 19, the relay 21 and the switch 22. The remaining portion of the apparatus is connected as before.

It is seen that this invention provides a telephone answering system wherein no electrical connections are made to the telephone.

Although the invention has been described with respect to preferred embodiments, it is not to be so limited as changes and modifications may be made which are within the full intended scope as defined by the appended claims.

I claim:

1. Apparatus for automatically answering a telephone without any mechanical or electrical connections to the telephone comprising, a first microphone mounted adjacent the telephone for detecting the ringing of the telephone, a recorder connected to the first microphone, a volume-level indicating light on the recorder, a photoelectric cell mounted near said light and producing an electrical output when the light becomes bright as the telephone rings, a second microphone connected to the recorder and mounted near the ear piece of the telephone, a record player with a speaker mounted near the mouth piece of the telephone, a weight lifting relay mounted near the telephone, a weight controlled by the weight lifting relay, said weight movable from a first position in engagement with the on switch of the telephone and to a second position out of engagement with the telephone, and switching means connected to the record player, the recorder, and the weight lifting relay to turn on the recorder and record player and energize the weight lifting relay and said switching means controlled by the photoelectric cell.

2. A telephone answering apparatus comprising a telephone, a record player, a recorder, a volume-level indicating light mounted on said recorder, a photoelectric cell mounted adjacent said light and energized thereby when the telephone rings, a weight lifting relay connected to the telephone, a trigger mechanism mounted on the record player, said trigger mechanism actuated by the photoelectric cell, an actuating switch on the trigger mechanism, said actuating switch connected to the weight lifting relay to energize it so that the telephone circuit is useable, said actuating switch connected to the recorder, and the record player to render them operative, a first microphone connected to the recorder and mounted near the telephone to pick up sound from the bell of the telephone which causes the indicating light to become bright and actuate the photoelectric cell, a second microphone connected to the recorder and mounted near the earpiece of the telephone, and a speaker connected to the record player and mounted adjacent the mouth piece of the telephone.

3. A telephone answering device comprising a telephone with an earpiece and a mouthpiece, a recorder with a volume-level indicating light coupled to the earpiece of the telephone, a record player coupled to the mouthpiece of the telephone, a photoelectric cell mounted adjacent the light and energized when the phone rings, a voltage source with one side connected to ground and the other side connected to the photoelectric cell, a trigger switch which is closed when the telephone is not being used connected in circuit with the photoelectric cell, a trigger relay connected in circuit with the trigger switch and the photoelectric cell, a trigger mechanism on the record player supporting the trigger switch, said trigger relay connected to the trigger mechanism to actuate it and thus open the trigger switch, an actuating switch mounted on the trigger mechanism and open when the telephone is dormant, said switch closed when the trigger mechanism has been actuated when the telephone rings, and the actuating switch connected to the recorder and the record player to render them operative so that a message may be recorded.

4. A device for answering a telephone which has a bell, a mouthpiece and an earpiece comprising, a recorder with a volume-level indicating light which becomes brighter when the bell of the telephone rings, a record player coupled to the mouthpiece of the telephone, a photoelectric cell mounted adjacent the light and energized thereby when the telephone rings, a voltage source with one side connected to ground and the other side connected to the photoelectric cell, a trigger switch which is closed when the telephone is not being used connected in circuit with the photoelectric cell, a trigger relay connected in circuit with the trigger switch and the photoelectric cell and energized by the photoelectric cell when the telephone bell rings, a trigger mechanism on the record player supporting the trigger switch, said trigger relay connected to the trigger mechanism to actuate it and thus open the trigger switch, and actuating switch when the telephone bell rings mounted on the trigger mechanism which is open when the telephone is not being used, said switch closed when the trigger mechanism has been actuated when the telephone bell rings, and the actuating switch connected to the recorder and the record player to energize them and a weight lifting relay connected to the actuating switch and energizing the telephone when said switch is closed.

5. A device for answering a telephone having a bell, a mouthpiece, and an earpiece comprising, a recorder coupled to the earpiece and with a volume-level indicating light which brightens when the telephone bell rings, a record player coupled to the mouthpiece, a photoelectric cell mounted adjacent the light and energized when the telephone bell rings, a voltage source with one side connected to ground and the other side connected to the photoelectric cell, a trigger switch which is closed when the telephone is not being used connected in circuit with the photoelectric cell, a trigger relay connected in circuit with the trigger switch and the photoelectric cell and energized when the telephone bell rings, a trigger mechanism mounted on the record player and supporting the trigger switch, said trigger relay connected to the trigger mechanism to actuate it and thus open the trigger switch, an actuating switch when the telephone bell rings mounted on the trigger mechanism which is open when the telephone is not energized, said switch closed when the trigger mechanism has been actuated when the telephone bell rings, and the actuating switch connected to the recorder and the record player to actuate them when the telephone bell rings, a pair of microphones with the first mounted adjacent the telephone and connected to the recorder to cause the indicating light to brighten and energize the photoelectric cell when the telephone bell rings, and the second microphone mounted adjacent the earpiece of the phone and connected to the recorder, and a speaker connected to the record player and mounted near the mouthpiece of the telephone.

References Cited in the file of this patent

UNITED STATES PATENTS

| | | |
|---|---|---|
| 2,052,110 | Pfister | Aug. 25, 1936 |
| 2,096,758 | Purington | Oct. 26, 1937 |
| 2,374,842 | Shively et al. | May 1, 1945 |
| 2,539,139 | Jordanoff et al. | Jan. 23, 1951 |
| 2,646,478 | Euler et al. | July 21, 1953 |
| 2,673,241 | Van Deventer | Mar. 23, 1954 |
| 2,703,348 | Knapp et al. | Mar. 1, 1955 |